United States Patent [19]

Dekrone

[11] Patent Number: 4,627,292
[45] Date of Patent: Dec. 9, 1986

[54] AC TRANSDUCERS, METHODS AND SYSTEMS

[75] Inventor: Stephen A. Dekrone, Chesapeake, Va.

[73] Assignee: Randek Inc., Richmond, Va.

[21] Appl. No.: 627,667

[22] Filed: Jul. 3, 1984

[51] Int. Cl.$^4$ .............................. G01L 7/08; G01L 9/10
[52] U.S. Cl. ........................................ 73/728; 73/722; 73/862.64; 336/30; 336/110; 324/207
[58] Field of Search ................... 336/30, 110; 73/722, 73/728, 862.64; 324/207, 208

[56] References Cited

U.S. PATENT DOCUMENTS

| | | | |
|---|---|---|---|
| 1,718,494 | 6/1929 | Schurig | 336/30 |
| 2,139,509 | 12/1938 | Marcellus | 128/675 |
| 2,260,837 | 10/1941 | Kuehni | 73/728 |
| 2,266,608 | 12/1941 | Kuehni | 336/30 |
| 2,428,231 | 9/1947 | Mapp | 271/42 |
| 2,430,757 | 11/1947 | Conrad et al. | 340/870.32 |
| 2,510,073 | 6/1950 | Clark | 73/728 |
| 2,539,833 | 1/1951 | Hathaway | 73/728 |
| 2,558,190 | 6/1951 | Miller | 73/724 |
| 2,648,328 | 8/1953 | Hathaway et al. | 128/675 |
| 2,718,783 | 9/1955 | Anastasia | 73/386 |
| 2,788,664 | 4/1957 | Coulbourn et al. | 73/728 |
| 2,847,625 | 8/1958 | Popowsky | 73/722 |
| 3,106,095 | 10/1963 | Tavis | 73/722 |
| 3,140,450 | 7/1964 | Tavis | 73/722 |
| 3,342,072 | 9/1967 | Trekell | 73/722 |
| 3,353,030 | 11/1967 | Michel | 307/88 |
| 3,487,306 | 12/1969 | Harmer | 324/133 |
| 3,503,267 | 3/1970 | Shiba et al. | 73/728 |
| 3,662,257 | 5/1972 | Fujiwara | 324/207 |
| 3,664,370 | 5/1972 | Warnow | 137/487.5 |
| 3,727,463 | 4/1973 | Intraub | 73/702 |
| 3,825,908 | 7/1974 | Engstrom | 340/174 PM |
| 3,841,157 | 10/1974 | Willock | 73/728 |
| 3,877,314 | 4/1975 | Bernin | 73/517 B |
| 4,014,319 | 3/1977 | Favre | 128/675 |
| 4,140,971 | 2/1979 | Blincoe | 324/208 |
| 4,326,419 | 4/1982 | Herden | 73/728 |
| 4,339,955 | 7/1982 | Iwasaki | 73/728 |
| 4,351,191 | 9/1982 | Iwasaki | 73/728 |
| 4,354,506 | 10/1982 | Sakaguchi et al. | 73/729 |
| 4,401,945 | 8/1983 | Juengel | 324/207 |

OTHER PUBLICATIONS

Darling, IBM Bulletin, vol. 12, No. 4, Sep., 1969.

*Primary Examiner*—Donald O. Woodiel
*Attorney, Agent, or Firm*—Dennison, Meserole, Pollack & Scheiner

[57] ABSTRACT

A position and motion transducer is described comprising means for providing a permanent magnetic field adjacent an appropriately oriented toroidal transformer, which can be either an isolation transformer or an autotransformer. The means for providing a permanent magnetic field, in an especially useful embodiment is a permanent magnet cobalt disk magnet with its surface pole facing generally radially in the plane of the torus or generally perpendicular the axis thereof. Appropriate excitation of one winding of the toroidal transformer enables readout equipment connected with the other winding to indicate the position and movement of the magnet relative the toroid. Appropriate mounting of the magnet enables various measurands to be indicated. For example, mounting the magnet on or for movement with a diaphragm enables fluid pressures applied thereto to be measured while mounting the magnet on a spring support force plate or piston/cylinder enables the force or weight applied thereto to be measured.

40 Claims, 8 Drawing Figures

AC TRANSDUCERS, METHODS AND SYSTEMS

FIELD OF THE INVENTION

This invention relates to AC transducers, particularly miniature transducers, and transducer systems, and more particularly to methods, transducers, and systems for force, pressure, movement, velocity, acceleration and the like measurement, utilizing the effect of moving a permanent magnetic field relative to an electrically excited, appropriately oriented toroidal transformer.

In one embodiment this invention is particularly useful when applied to methods, transducers and systems for determining various pressures, enabling measurement of absolute, gage and differential pressures over a wide range, with instantaneous response to pressure variation with great accuracy, with a transducer substantially immune to shock, corrosive fluids and radiation, and temperature stable, especially suitable for medical, scientific, and industrial uses, even in contact with explosive gases and biological fluids and providing absolute safety against electrical shock hazard. This invention enables very small, yet durable and accurate instruments.

Most especially this invention finds particular utility in one embodiment as applied to miniature pressure transducers for medical diagnosis and treatment and in scientific and industrial instrumentation.

BACKGROUND OF THE INVENTION

The transducer art is replete with devices wherein a magnetic or ferromagnetic shunt or armature is moved in the magnetic circuit of one or more electromagnetic coils so that readout equipment responsive to the inductance change can be activated to relate the movement of the armature or shunt to a desired measurand. Typical of such devices are "E" core inductive transducers and displacement sensors that exploit the changes in the self (or mutual) induction by moving a permanent magnet relative to a high-mu core of a solenoid. The idea of measuring external magnetic fields by observing changes in the reactance of a toroidal coil caused by variations of the effective permeability due to the field under observation has also been suggested (Instrumentation in Scientific Research Lion, Kurt S., 1959, pp 199-202) but the system described therein is stated to have nonlinear characteristics and requires empirical calibration.

Pressure measurements are frequency used for medical diagnosis and treatment and in scientific and industrial situations. Examples of typical uses for the invention would be monitoring physiological pressure, industrial processes, scientific studies such as siesmic waves, etc.

Prior art transducers useful for measurement of pressures have certain inherent limitations. Many prior art transducers such as the Wheatstone bridge, quartz crystal and piezoelectric are sensitive to sudden fluctuations in temperature. Operation of prior art transducers require careful control of the environmental temperatures and the temperature of the mediums being measured. If the temperature effecting the device should vary by as little as ten degrees Fahrenheit. then the accuracy of the measurement is affected. Several devices of the Wheatstone bridge type must go through a delay in use while internal electrical means are used to achieve operating temperature stability. Should sufficient temperature variations occur during use it then becomes necessary to recalibrate the device, introducing undesirable delays in procedures.

Several prior art devices may be damaged or may need recalibration if they are subjected to mechanical shock. Normal use of these devices does require unusual care to protect the device from relatively minor levels of physical shock, such as produced when the device is dropped.

Certain prior art devices lack sufficient sensitivity for many of the technical demands of the medical, scientific, and industrial professions. Certain devices will not sense small changes in applied pressures that occur in short periods of time. Many prior art devices lack the sensitivity to respond to small pressure changes.

Several prior art devices have certain inherent delays in their response to pressure changes. Design limitations delay the initial response by a device to an applied pressure. Design limitations can delay the time for the device to return to a resting state after an applied force has been removed. Such fluctuations in response characteristics introduce potential sources of error for time related analysis of pressure variations.

Certain prior art devices are subject to damage or the need for recalibration if they are exposed to applied pressures outside of relatively narrow operation limits. A device can be overpressurized by process failures and errors in user technique during installation and use. Delay in data collection and possible collection of incorrect data can be caused by overpressurization and damage to prior art devices.

A small excitation current is generally necessary for proper function of prior art devices with the physical constraints of designs of prior art devices resulting in devices that use a fragile pressure sensing diaphragm to electrically insulate the transducer excitation from the fluid being observed. Pressure responsive diaphragms are subject to rupture, allowing fluids or gases to come in contact with the electrical portion of the transducer producing a finite and potentially hazardous current leakage.

OBJECTS OF THE INVENTION

It is among the primary objects of the present invention to provide new and improved transducers, methods, and transducer systems, especially useful for the transducing of force, pressures, movements, velocities, acceleration, and other measurands into electrical output, the output varying with the applied force, pressure, position, change in position, velocity, acceleration or other measurand; that will work in those situations that require such monitoring, be it industrial, scientific, medical, or otherwise; designed to measure variations in such measurands in vacuum, or gaseous or liquid environments of all types and combinations; that is of a small and compact size; that is yet durable; that is cost effective to produce; that is very sensitive to variations in the measurand yet is substantially insensitive to physical damage, and temperature shock; that has no lag time in responding to changes in the measurand or to reversals in the direction of change thereof; and that is not temperature or radiation sensitive.

It is among other primary objects of the present invention, in addition to the foregoing, to provide such methods, transducers and transducer systems broadly usable, for example and not by way of limitation; as load cells, commonly used for force sensing and for scales and weighing; for sensing position and movement; for sensing velocity and accelerations, for sensing vibration; for flow measurement; for leak detectors; for sensing liquid levels, for motion sensors and sensing; and for seismic applications.

It is among yet other primary objects of the present invention, in addition to each of the foregoing, to provide new and improved methods, apparatus, and systems of instrumentation utilizing the effect of moving a permanent magnetic field relative an A-C excited, appropriately oriented toroidal transformer.

It is among yet other primary objects of the present invention, in addition to each of the foregoing objects, to provide new and improved transducers and methods and tranducer systems, especially useful for the sensing of pressures, pressure changes, and differential pressures, and providing an electrical output, the output varying with the applied pressure; that will work in those situations that require pressure monitoring, be it industrial, scientific, medical, or otherwise; designed to measure variations in gaseous or liquid pressures of all types and of combinations of gases and liquids; that is of a small and compact size; that is cost effective to produce; that is yet durable in use; that is very sensitive to pressure variations yet is insensitive to physical damage, and temperature shock; that has no lag time in responding to initially applied pressure; and that does not have inherent lag times in recovering after the pressure has been reduced in the area of the sensor.

It is among yet still other primary objects of the present invention to provide such pressure transducers and transducer systems broadly usable, for example and not by way of limitation; for sensing differential pressures, gaseous and liquid; for sensing gage pressure, negative pressures or vacuums; for differential flow measurement; for pressure loss leak detectors; for sensing liquid and gaseous depths; for sensing altitudes and depths; and for sensing pressure drops across filters.

It is a feature of the present invention that all electrical elements can be thoroughly isolated from any possible contact with the source of pressure or movement, even upon failure of the diaphragm or other rupture or leak in the transducer.

SUMMARY OF THE INVENTION

A position and motion transducer is described comprising means for providing a permanent magnetic field adjacent an appropriately oriented toroidal transformer, which can be either an isolation transformer or an autotransformer. The means for providing a permanent magnetic field, in an especially useful embodiment is a permanent magnet cobalt disk magnet with its surface pole facing generally radially in the plane of the torus or generally perpendicular the axis thereof. Appropriate excitation of one winding of the toroidal transformer enables readout equipment connected with the other winding to indicate the position and movement of the magnet relative the toroid. Appropriate mounting of the magnet enables various measurands to be indicated. For example, mounting the magnet on or for movement with a diaphragm enables fluid pressures applied thereto to be measured while mounting the magnet on a spring support force plate or piston/cylinder enables the force or weight applied thereto to be measured.

DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which:

FIG. 3 is a sectional view of a load cell in general design, for use in monitoring force, weight, movement, and the like;

DETAILED DESCRIPTION OF THE INVENTION

This invention overcomes the aforementioned problems with prior art devices. This invention consists of an electrically isolated toroid inductor that interacts with a magnet which, in one illustrated embodiment is mounted on a movable wall, such as by being associated with a pressure sensing diaphragm and in another is illustrated with a force sensing piston supported on a calibrated spring. The diaphragm moves in response to pressure fluctuations and the diaphragm movement causes the magnet to move generally radially of the toroid inductor. Similarly, the piston moves in response to force fluctuation inwardly thereon moving the magnet generally radially of the toroid inductor. The toroid inductor is electrically excited in a non-resonant and unsaturated manner during operation. The movement of the magnet produces a change in the magnetic flux at the inductor core causing measurable variations in output amplitude from the toroid inductor.

While the magnet is in all instances herein illustrated as being a permanent magnet, the source of the field is secondary to its presence. It could likewise be generated by an electromagnet. In the instant specification and subjoined claims, permanent magnetic field is to be read and interpreted only relative the measurement time period; it should be "permanent" and constant during the measurement interval or period but may be generated by an electromagnet or a permanent magnet.

This device relies on the coercive forces of the magnetic flux acting upon the toroid inductor core. The magnet does not come in physical contact with the inductor or core. There is no mechanical linkage between the magnet and inductor. As a result of structure and design this system has been found to be very temperature stable. There is no need for temperature compensating or controlling features for this invention. There is no need for an initial temperature stabilizing period prior to device use. There is no need to recalibrate this device if operating temperatures fluctuate during use.

This device does not require recalibration after receiving a mechanical shock that would require recalibration of prior art devices. The electrical leads and the inductor may be encapsulated in a mechanically stable housing. The magnet is not affected by normal physical abuse. The invention improves upon prior art by producing stable transducer response without the need for device recalibration after being subjected to heretofore destabilizing, but not permanently damaging, mechanical shock.

The structure of this invention responds to very small changes in applied force or pressure. This device will show measureable variations in output amplitudes when the diaphragm and magnet are subjected to very slight pressure changes or other means provides very slight movement of the magnet relative the toroid transformer. This device displays significantly greater sensitivity to applied forces when compared to sensitivities available from prior art devices. This invention uses a design that responds more rapidly to pressure changes than do prior art devices.

The methods and apparatus of the present invention enable highly durable, highly compact transducer structures.

This invention exhibits rapid response time (i.e., zero phase shift between input and output) initially, and returns to the resting state rapidly, once an applied force is removed. The improved response times during operation of the invention are the result of a structural design that uses magnetic coupling between the variations in input pressures and resultant variations in amplitude output. Certain prior art devices rely upon mechanically restrictive designs having slow response times to transduce variations in applied pressures to variations in electrical output.

The current invention is resistant to damage from excessive applied presures. Prior art devices may be damaged if excess pressures are applied to their physical coupling and electrical components. The current device does not rely upon mechanical coupling to transfer pressure variations from the diaphragm to the electrically excited inductor. The invention uses variations in magnetic flux density to transduce the applied forces. The magnet associated with the diaphragm moves through an air space within the invention and does not mechanically interconnect with any other part of the invention. The portion of the invention that encapsulates the inductor may act as a stop to limit the maximum travel of the magnet and diaphragm during extreme overpressure conditions. The inductor itself is isolated and unaffected by extremes in applied pressure.

The invention can be designed with electrical isolation between the excited portion of the device and the applied pressure portion of the device. The electrically excited inductor can be encapsulated by a non-conductive material. Should the diaphragm rupture, the electrically excited portion of the invention will remain electrically isolated from the system. This isolation is a significant improvement over prior art devices. A high degree of protection from current leakage is afforded the system by this invention.

DESCRIPTION OF THE PREFERRED EMBODIMENTS

Figure 1:
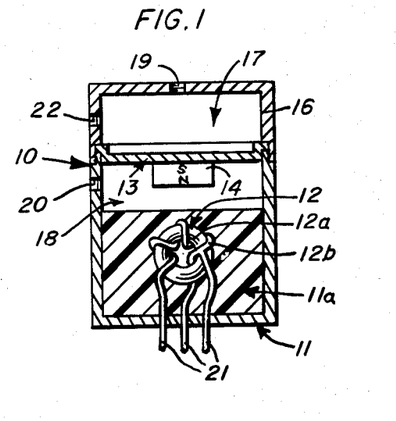
FIG. 1 is a sectional view of a pressure transducer, in general design, for use in monitoring fluid pressures.

With reference now to the drawing, and more particularly to FIG. 1 thereof, there is shown and illustrated a pressure transducer designated generally by the reference character 10 having a generally cylindrical main housing 11 enclosing a toroid inductor 12 encapsulated in housing portion 11. The toroid inductor 12 may be embedded in a potting material 11a or other suitable material. The housing portion 11 may be of generally any desired material and may, for example, comprise stainless steel or titanium so as to be biologically neutral. Alternatively, the housing may be of molded plastic of one piece molded construction to integrally embed the toroidal inductor 12. The toroid inductor 12 is positioned generally perpendicular to a movable wall such as a diaphragm 13 held by a pressure cover 16. A magnet 14 which may, for example, comprise a cobalt disc magnet is positioned against either side of the diaphragm 13 with one pole positioned facing the toroid inductor 12 defining a monopole directed generally radially thereof.

The cover 16 may also be of substantially any desired suitable material and, therefore, may also be of stainless steel or titanium, or of plastic, if biologic neutrality is not needed or other use criteria would be satisfied thereby, other materials could, of course, be used. The diaphragm 13 may also be substantially circular and of substantially any material, metal, or plastic, but for biologic uses stainless steel or titanium are probably preferable. In view of the small size and sensitivity possible, stainless steel discs have been found highly satisfactory. While cobalt disc magnets have been found particularly satisfactory, especially for medical and scientific instrumentation because of their stability under varying temperature conditions, for example, and immunity to radiation damage, enabling heat or radiation sterilization by autoclaving or gamma radiation. Other high flux density magnets, however, may also be used, such as ceramic or rare earth magnets. By generally radially is meant within about a 60° window, i.e., ±30° from the radial.

The position of diaphragm 13 produces cavity 17 and cavity 18. Cavity 17 generally is the area of the apparatus pressurized in the system being studied as by port 19. Cavity 18 generally contains the reference pressure of the system. Frequently cavity 18 is open to atmospheric pressure but it may also be connected to some specific reference pressure source, as by port 20.

Toroidal inductor 12 comprises a high permeability, magnetically soft core 12a, preferably having high temperature stability and low hysteresis, such a ferrite. Wound on the toroidal core is an inductor coil or winding 12b having at least two winding portions or segments so as to define a transformer preferably of low input and output impedance. The winding portions may comprise one continuous tapped winding to define an autotransformer or electrically isolated windings may define an isolation transformer. Winding electrical leads 21 extend from the toroid 12 out of the housing 11. Part 16 and part 11 may be held together by one of several different means, such as by being threaded and screwed together, welded or bonded together, bolted together, or fastened in several other ways.

By high permeability is meant permeability of from about $10\mu$ to about $5000\mu$. In the case of fluid pressure measurements, in FIG. 1 as one type of configuration, there is often a port 22 on the applied pressure side of the transducer 10 to allow removal of entrapped air. Air is very compressable and its presence in the system would lead to errors in data. Once entrapped air is removed through port 22 the port is closed.

Figure 2:
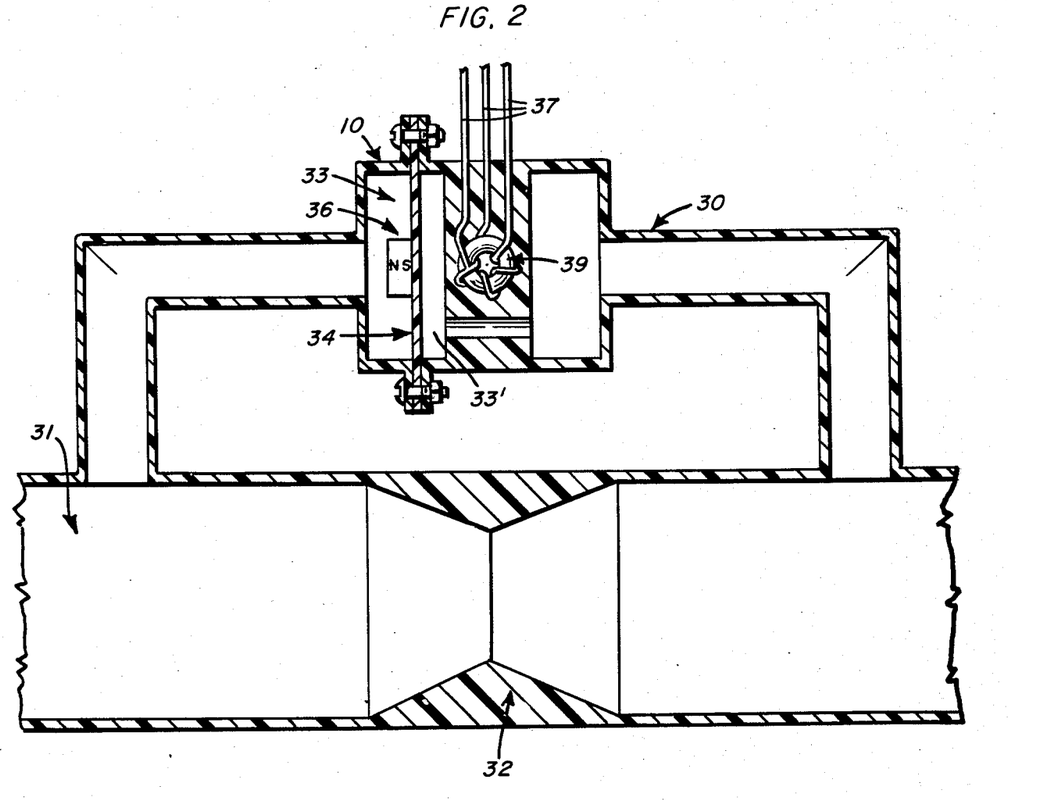
FIG. 2 is a sectional view of a pressure transducer, in general design for use in monitoring differential gas pressures.

With reference now to FIG. 2, a second embodiment of pressure transducer in accordance with the present invention may be generally structured as shown therein. The pressure transducing system 30 is connected to a tube 31 containing a constriction 32. The constriction 32 produces differential pressures between the two sections of tube 31. This invention allows analysis of the differential pressures that are created.

The pressure transducing system 30 responds to variations in pressure in cavity 33 and cavity 33'. Differential pressures cause the diaphragm 34 to move either toward or away from the toroidal transformer 35. Movement of the diaphragm 34 causes the magnet 36 positioned against the diaphragm 34 to move. Movement of magnet 36 causes a change in the magnetic flux interacting with toroidal transformer 35. This changing magnetic flux induces in toroidal transformer 35 variations in output amplitude when excited. Variations in output amplitude in the output ones of coil electrical conductors 37 are analyzed by the use of appropriate monitors, chart recorders, and the like. The output amplitude of the system may be used for measurement and control of the processes under study.

In practice the transducer may be encased in a number of different housings. In general the housing for the device will vary in its dimensions based upon the design restriction and criteria of the system being studied.

As has been heretofore pointed out, the present invention is general to sensing or transducing of mechanical or motion related or relatable measurands. That is, any measurand that can be adapted to move the permanent magnetic field generally radially of the toroidal transformer can be sensed or transduced. While until now pressure transducing has been stressed, an entire second class of devices can be designed utilizing the teachings of the present invention, better suited to other uses than pressure measurement. It should be noted, however, that the diaphragm supported magnet design heretofore discussed in detail is not necessarily limited to pressure measurement. The diaphragm may be directly stressed by other force application, such as by a push rod, or, hydraulic fluid may be utilized as a flexible connection to a force measuring or receiving piston-cylinder positive displacement pump for force or motion sensing. Similarly, a different form of movable wall, such as a piston-cylinder arrangement may replace the diaphragms of FIGS. 1 and 2, exposed to the fluid being sensed and supporting the magnet. However, as a general rule, the problems of sealing a sliding wall piston-cylinder combination make diaphragm arrangements more preferable for fluid applications, such as pressure sensing and measurement, while sliding wall piston-cylinder mounting arrangements for the magnet are most preferably limited to dry measurements, such as sensing of force, weight, motion, position, and the like, including derivatives thereof.

Figure 3:
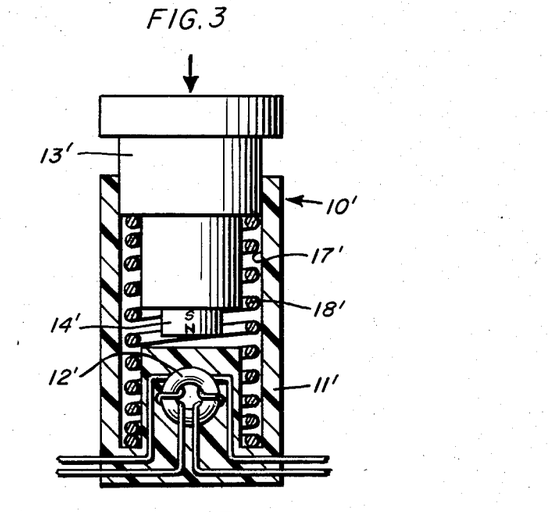

With reference now to FIG. 3, there is shown and illustrated another embodiment or modification of AC transducers constructed in accordance with the present invention, a force, weight, or motion sensor in the form of a load cell, designated generally by the reference character 10'. The load cell 10' comprises a housing 11 which may, as shown, be of generally cylindrical configuration of integral, one-piece molded construction of structural plastic, or the like, having embedded therein a toroidal transformer 12' disposed within or adjacent a generally cylindrical bore 17'. Slidably movable within the bore 17' is a piston 13' carrying on or in one movable wall end face a magnet 14, which may, as heretofore detailed, comprise a cobalt disc magnet arranged as a monopole facing generally radially of the toroidal transformer 12', the piston 13' being adapted to receive the force or weight to be sensed. Between the housing 11' and the piston 13', generally within the bore 17', there may be positioned a calibrated spring 18'.

Figure 4:
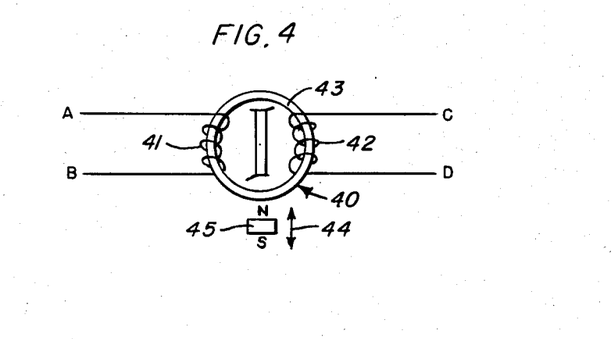
FIGS. 4 and 5 are electrical schematic diagrams of the transducer connections.
Figure 5:
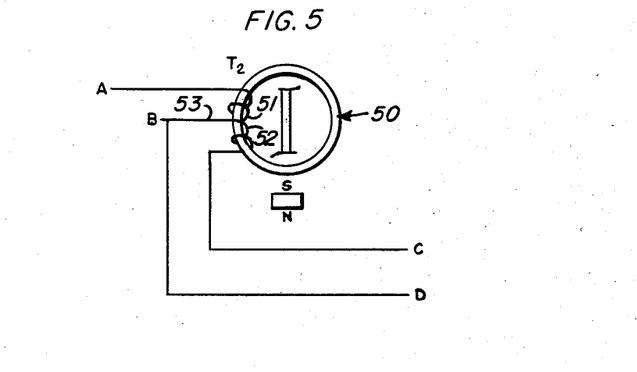

With reference now to FIGS. 4 and 5, the generalized form of transducer and its system connections are diagrammatically shown.

Two configurations are provided, with both being operationally similar. The first configuration, transducer 40 (FIG. 4) consists of two electrically isolated winding portions of coils 41 and 42 wound upon a ferrite core 43 of high permeability. Excitation voltage is applied to terminals A and B of the primary winding (coil) 41 of transducer 40. The output voltage at terminals C and D of the secondary winding (coil) 42 is proportional to the position 44 of the permanent magnet 45.

The second transducer configuration 50 (FIG. 5) operates in a manner similar to the isolation transformer 40. In this configuration the primary and secondary windings 51 and 52 are basically a single split or tapped coil or winding with an appropriate tap 53 which may be used as the common terminal and is noted on the schematic as terminal B and D. The symbol contained within the core on the schematics (FIGS. 3 and 4) denotes a magnetically soft core, i.e., one in which a relatively large flux density is obtained at a fixed excitation level.

Although the fundamentals of the transducer operation are believed understood, it is not yet fully clear that all of the phenomena are fully understood. Experimental results, however, have made it clear that a very small displacement of the permanent magnet can cause a pronounced effect on the toridal transformer.

EXAMPLE 1

A sensor was constructed using a ferrite toroidal core with an outside diameter of 0.1 inches wound with 10 turns each in the primary and secondary coils or windings and one winding was excited with a sine wave signal of 2.5 kilohertz (k Hz) at 10 millivolts (mv). Input and output impedences were about 10 ohms. A 0.056 inch diameter cobalt disk magnet having a flux density of about 9000 gauss was mounted with one pole defining a monopole facing generally radially of the toroidal transformer at an average spacing of 0.125 inches. A movement of the magnet over a range of 0.0001 inches radially of the toroid resulted in totally linear variation in the output voltage from the toroidal transformer of 0.3 millivolts (mv).

As best presently understood, as the permanent magnetic disk is brought in the vicinity of the toroid, it induces a magnetic field in the toroid. The strength of the induced magnetic field is dependent on both the orientation of the magnetic disk relative to the toroid and the distance between them. A displacement of the disk will cause a corresponding change in the internal magnetic field of the toroid. Because the core of the toroid is made of ferromagnetic material, a change in the internal magnetic field is accompanied by a change in the effective permeability (mu). In that the mutual induction between the coils of the toroid (or self induction in the autotransformer mode) is proportional to the effective permeability of the transformer core, the change in permeability is reflected by a change in the signal on the output side of the toroidal transformer with a constant excitation signal. In the case where the displacement of the magnetic disk is toward the toroid, the internal field of the toroidal core increases, causing a decrease in the permeability and the mutual inductance. This change in mutual induction is reflected by a lower output signal from the transformer.

The device performs optimally when the magnet is perpendicular to the torus, however, some broad range of mechanical relationships exist.

Through a range of about plus or minus 30 degrees from perpendicular the device performs equally well and when plus or minus 90 degrees is reached there is no longer any measureable change in output.

The effects of geometry are undoubtedly related to the placement of a strong magnet near the toroid in such a way that magnetic lines of force (flux) are diverted through the toroidal core. The degradation of performance beyond this window of about 60 degrees is most likely due to the combined effects of:

a. as the magnetic disk is rotated away from the perpendicular the center of the disk, i.e., the magnetic pole, is displaced away from the toroid effectively reducing the magnetic field at the toroid.

b. at large angles from the perpendicular, less magnetic lines of flux enter the toroid along the circumference.

c. the magnetic field of a dipole is weaker along the perpendicular than along the axis.

The sum effect appears to be that the magnetic field affecting the permeability is reduced significantly as the magnetic disk is rotated away from the perpendicular.

The unique feature of the toroidal coil in the absence of external fields is that the magnetic field caused by a uniform current through the windings is effectively contained to the core of the toroid. This is true even if the toroidal core is nothing but air. The magnetic lines of flux are circular and coaxial to the toroid which means that there are no magnetic poles asociated with a toroidal coil. When the windings are not uniform, as in this transformer, there is some leakage of the flux outside of the core. However, with high-permeability cores, the leakage is generally small. In this device this effect is believed insignificant.

It should also be noted that a torus of high permeability will effectively shield the center of the torus from external fields that are parallel to the plain of the torus.

Certain prior arts use a saturated inductor, and this device utilizes the unsaturated mode, with the components as selected.

The magnetic field set up by the d.c. winding, neglecting flux leakage and hysteresis effects, can be approximated by $$B = \mu Ni/2\pi r \text{ (MKS system of units)}$$

where B is the magnetic field inside the core in webers/sq meter (1 W/sq m = 10,000 gauss), $\mu$ is the permeability, i is the current through the auxiliary windings and r is the mean radius of the core. The value of $\mu$ is not a constant and must be obtained from the magnetization curves.

To determine where on the magnetization curve you are working (saturated or unsaturated), consideration must also be given to the effects of the magnetic field (or flux) induced by the permanent magnetic disk. It is possible to drive the core to saturation through the influence of an external field in the same way as with an auxiliary current. However the instant device is operated in an unsaturated mode.

Figure 6:
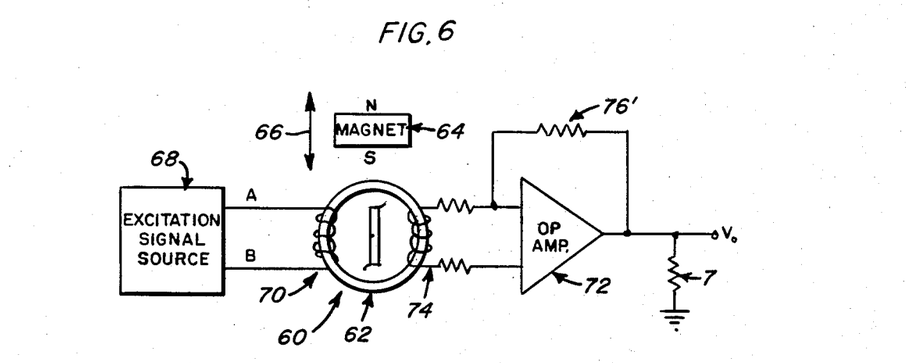
FIG. 6 is an electrical and mechanical schematic diagram of a sensing system in accordance with the present invention.

As hereinbefore pointed out, both the transducer and the system of use are believed new. With reference therefore now to FIG. 6, there is shown and illustrated a generalized transducing and sensing system in accordance with the present invention, with the means for interfacing the magnet position input being omitted for clarity.

A transducer of the isolation transformer type, such as those previously described is designated generally by the reference character 60. Appropriately mounted, by mounting, housing, and input means, not shown, are a high permeability, magnetically soft core, such as a toroid 62, and a magnet 64 having a pole facing the toroid generally radial the ring, to provide relative radial movement therebetween as indicated by the arrow 66 in response to changes in a measurand. Although generally a permanent disk magnet is preferable for ease of mounting, other forms of magnet generally providing a unipole to the core 62 could be used, including an electromagnet.

Also provided is an excitation signal source 68 such a an oscillator connected with a primary coil or winding 70 on the core 62 and an operational amplifier 72 has its inputs connected with the secondary winding or coil 74 on the core 62.

The excitation signal source 68 is most commonly an electronic oscillator producing a suitable output waveform of fixed amplitude. This suitable waveform is applied to the magnetically soft (coercive) core of the torus 62 via winding 70. The voltage output at winding 74 is caused to vary by the magnetic field eminating from the magnet 64 which is mechanically connected as via a diaphragm to a pressure medium or other measurand being measured.

The operational amplifier 72 which is properly biased by resistor 76 and gain resistor 76' adjusts the variable amplitude (voltage) from the transducing device 60 consisting of primary winding 70, high permeability magnetically soft core 62, secondary winding 74, and magnet 64 to a level sufficient to drive the indicating device (not shown) as the operational amplifer 72 exhibits optimum performance when properly terminated by load resistor 7. The indicating device connected at VO may be devices such as an oscilloscope, recorder, voltmeter, etc. which, along with the necessary interface electronic circuits will provide a means of displaying the transduced signal.

Figure 7:
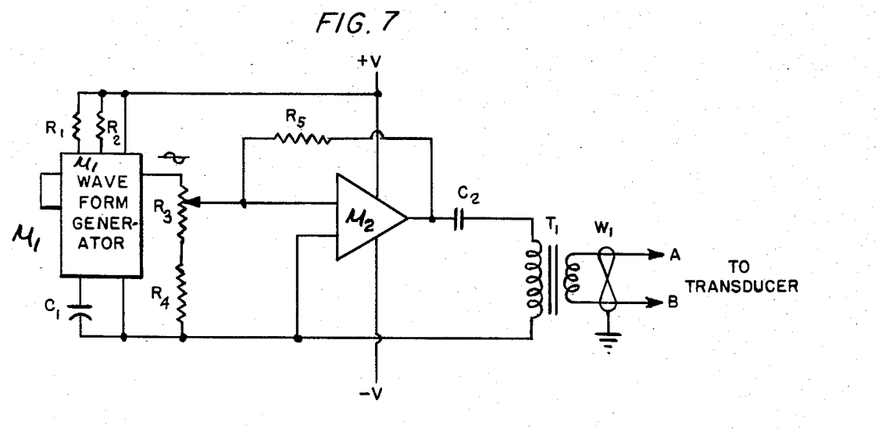
FIG. 7 is an electrical schematic diagram of an excitation source circuit suitable for use in the present invention.

With reference now to FIG. 7, there is shown in more detail another means of electrically stimulating or exciting the transducer.

Microcircuit U1 is an integrated circuit waveform generator with a sinusoidal output waveform. Resistors R1, R2 and capacitor C1 determine the output frequency. Resistors R3 and R4 function as the output load with R3 being adjustable to provide a means of varying the input to microcircuit U2, an integrated circuit operational amplifier. Operations amplifier U2 provides isolation (buffering) and has its gain adjusted by the selected value of fixed resistor R5. Capacitor C2 couples the amplifier U2 output to transformer T1. The transformer T1 provides the necessary impedance match of the amplifier to the cable W1 which electrically conducts the excitation voltage to the transducer which may be physically separated from the electronics.

Figure 8:
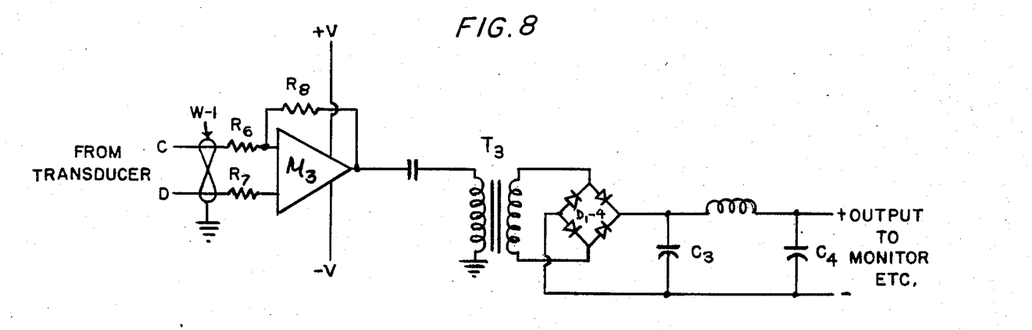
FIG. 8 is an electrical schematic diagram of a readout detector and drive circuit suitable for use in the present invention.

With reference now to FIG. 8 there is shown in more detail another circuit to provide the necessary amplification of the transducer variable output voltage and the detection thereof.

Microcircuit U3 provides amplification of the incoming variable voltage to the required level for processing and measurement. A further portion of the aforementioned cable W1 couples the transducer variable output voltage to integrated circuit operational amplifier U3 via resistors R6 and R7 which provide proper operating bias. Resistor R8 is selected to determine the amplification of Op Amp U3. Transformer T3 couples the Op Amp U3 to the detection circuit comprised of D1 through D4, C3, L1 and C4. Transformer T3 further provides a balanced output to the full wave bridge rectifier circuit comprised of diodes D1 through D4. The Pi filter comprised of C3, L1 and C4 serve to filter the remaining excitation voltage. The output of this circuit, (the voltage across C4) is then applied to an indicating instrument which may be in the form of a voltmeter, an oscilloscope, chart recording device, etc. as well as further processing circuits which may allow interfacing with a computer, control of external devices such as a pump or valve in a pressure measuring device configuration or any other means of utilizing this variable and proportional voltage.

In general, the circuits of FIGS. 7 and 8 provide enhanced electrical isolation of the media under measurement. This becomes very significant when considering the media under measurement may be a volatile gas or the myriad of physiological pressures measured in the human health care field. As noted in the enclosed schematics this enhanced isolation is provided by transformer T1 electro-magnetic coupling, transducer toroidal transformer magnetic coupling to the media under measurement as well as the electro-magnetic coupling between windings in the case of the isolatin transformer configuration, and by transformer T3 which provides coupling to the detection circuits. It should be noted that in the prior art transducing devices, a mechanical connection exists between the media under measurement and the displacement sensing device i.e.: the variable arm (strain gauge) of a wheatstone bridge. While in normal operation this connection may be of an electrical insulating material, under certain failure conditions the media under measurement may be applied to the uninsulated sensing device. For example, in the event of a diaphragm rupture the media is applied to the strain gauge. In the instant device the displacement coupling is via magnetic means and no mechanical connection is required. Furthermore, the sensing device, a transducer toroidal transformer will be completely encapsulated in a non-conductive material thereby precluding inadvertant hazardous failure modes.

While the invention has been described, disclosed, illustrated and shown in terms of certain embodiments or modifications which it has assumed in pratice, the scope of the invention should not be deemed to be limited by the precise embodiments or modifications herein described, disclosed, illustrated or shown, such other embodiments or modifications as may be suggested to those having the benefit of the teachings herein being intended to be reserved, especially as they fall within the scope and spirit of the claims hereto appended.

What is claimed is:

1. A pressure transducing device comprising a movable wall to receive at least one variable applied pressure to be measured, and movable in response thereto, magnet means associated with said movable wall for movement therewith, and a toroidal inductor adjacent thereto, the position of said magnet means being generally radial of said toroidal inductor and being directly related to the applied pressure, said toroidal inductor comprising a toroidal core upon which is wound coil means of suitable inductance, said coil means being configured to allow sinusoidal excitation of a portion thereof from an external source and formed as a transformer, wherein an applied pressure will cause said magnet to continuously variably coerce the magnetic flux contained within the aforementioned toroidal core to effect a measurement of the variable pressure, the variation in such coercion being dependent upon the radial separation of said magnet means and said toroidal core thereby continuously varying the toroidal inductor output amplitude from a second portion of said coil means when said first coil portion is excited.

2. A pressure transducing device comprising a movable wall to receive at least one applied pressure, and movable in response thereto, magnet means associated with said movable wall for movement therewith, and a toroidal inductor adjacent thereto, the position of said magnet means being generally radial of said toroidal inductor and being directly related to the applied pressure, said toroidal inductor comprising a toroidal core upon which is wound coil means of suitable inductance, said coil means being configured to allow excitation of a portion thereof from an external source and formed as a transformer, wherein an applied pressure will cause said magnet to variably coerce the magnetic flux contained within the aforementioned toroidal core, the variation in such coercion being dependent upon the radial separation of said magnet means and said toroidal core thereby varying the toroidal inductor output amplitude from a second portion of said coil means when said first coil portion is excited, and the allowing monitoring of differential pressures further comprising means defining plural cavities separated by said movable wall.

3. Device according to claim 1, further comprised of a suitable housing, and a connecting cable.

4. Device according to claim 1 wherein said toroidal inductor is encapsulated in a non-conductive material offering improved electrical isolation.

5. Device according to claim 1 wherein said transformer is an auto-transformer.

6. Device according to claim 1 wherein said transformer is an isolation transformer.

7. Device according to claim 1 wherein said movable wall is a diaphragm.

8. Device according to claim 1 wherein said toroidal core is comprised of a high permeability magnetically soft material.

9. Device according to claim 1 wherein said toroidal core comprises a material having the characteristics of ferrite.

10. Device according to claim 1 whrein said magnet means comprises a permanent cobalt magnet.

11. Device according to claim 1 wherein said core has a permeability from about 10 mu to about at least 5000 mu.

12. Device according to claim 1 wherein said magnet means comprises a disk magnet arranged as a monopole facing said toroidal core generally radially thereof.

13. Device according to claim 12 wherein said magnet has a field strength of at least about 9000 gauss.

14. Transducer for movement or position measuring using coercive forces and a toroidal inductor wound as a transformer that transduces an applied variable, force or pressure to be measured to continuously variable output amplitudes, comprising a magnet, and means responsive to the applied variable force or pressure to be measured for moving said magnet generally radially adjacent said inductor within a range providing generally linear coupling changes between the windings of said inductor and a generally linearly varying output therefrom when excited generally sinusoidally to effect a measurement of the applied force or pressure.

15. A position or motion transducing device comprising a movable wall the position and motion of which is to be measured, magnet means associated with said movable wall for movement therewith, and a toroidal inductor adjacent thereto, the position of said magnet means being generally radial of said toroidal inductor, said toroidal inductor comprising a toroidal core upon which is wound coil means of suitable inductance, said coil means being configured to allow sinusoidal excitation of a portion thereof from an external source and formed as a transformer, wherein said magnet will continuously variably coerce the magnetic flux contained within the aforementioned toroidal core to effect a measurement of the variable pressure dependent upon the position of the magnet generally radial to the core, the variation in such coercion being dependent upon the radial separation of said magnet means and said toroidal core thereby continuously varying the toroidal inductor output amplitude from a second portion of said coil means when said first coil portion is excited.

16. Device according to claim 15 wherein said toroidal inductor is encapsulated in a non-conductive material offering improved electrical isolation.

17. Device according to claim 15 wherein said transformer is an auto-transformer.

18. Device according to claim 15 wherein said transformer is an isolation transformer.

19. Device according to claim 15 wherein said movable wall is a diaphragm.

20. Device according to claim 15 wherein said toridal core is comprised of a high permeability material.

21. Device according to claim 15 wherein said magnet means comprises a disk magnet arranged as a monopole facing said toroidal core generally radially thereof.

22. Transducer for movement or position measuring using coercive forces and a toroidal inductor wound as a transformer that transduces applied force or pressure to be measured to continuously variable output amplitudes, comprising a magnet, means responsive to the applied variable force or pressure to be measured for moving said magnet adjacent said inductor and means for encapsulating said inductor within a range providing generally linear coupling changes between the windings of said inductor and a generally linearly varying output therefrom when excited generally sinusoidally to effect a measurement of the applied force or pressure while enabling said magnet to coerce said inductor variably dependent upon the radial spacing thereof.

23. Posiiton and motion transducer comprising means for providing a generally unipolar permanent magnetic field radially movable adjacent an appropriately oriented toroidal transformer within a range providing generally linear coupling changes between the windings of said toroidal transformer and a generally linearly varying output therefrom when excited generally sinusoidally.

24. Transducer defined in claim 23 wherein said means for providing the permanent magnetic field comprises a disk magnet with its surface pole facing generally radially of the toroidal transformer.

25. Transducer of claim 23 together with means providing appropriate sinusoidal excitation of one winding of the toroidal transformer to enable readout equipment connected with the other winding to generally linearly indicate the position and movement of the magnet relative the toroidal transformer.

26. Position and motion transducer comprising a diaphragm, magnet means for providing a permanent magnetic field adjacent an appropriately oriented sinuosoidally excited toroidal transformer together with means for mounting the magnet means on for movement with the diaphragm to enable variable fluid pressures applied thereto to be measured.

27. A pressure transducing system comprising a movable wall to receive at least one applied variable pressure to be measured, and movable in response thereto, magnet means associated with said movable wall for movement therewith, and a toroidal inductor adjacent thereto, the position of said magnet means being generally radial of said toroidal inductor and being generally radially directly related to the applied pressure, said toroidal inductor comprising a toroidal core upon which is wound coil means of suitable inductance, said coil means being configured to allow sinusoidal excitation of a first portion thereof from an external source and formed as a transformer, wherein an applied pressure will cause said magnet to continuously variably coerce the magnetic flux contained within the afoementioned toroidal core to effect a measurement of the variable pressure, the variation in such coercion being dependent upon the radial separation of said magnet means and said toroidal core thereby continuously varying the toroidal inductor output amplitude from a second portion of said coil means when said first coil portion is excited together with means for exciting said first coil and means for measuring the voltage induced in said second coil portion and relating said second voltage to the applied pressure.

28. A pressure transducing system comprising a movable wall to receive at least one applied pressure, and movable in response thereto, magnet means associated with said movable wall for movement therewith, and a toroidal inductor adjacent thereto, the position of said magnet means being generally radial of said toroidal inductor and being generally radially directly related to the applied pressure said toroidal inductor comprising a toroidal core upon which is wound coil means of suitable inductance, said coil means being configured to allow excitation of a first portion thereof from an external source and formed as a transformer, wherein an applied pressure will cause said magnet to variably coerce the magnetic flux contained within the aforementioned toroidal core, the variation in such coercion being dependent upon the radial separation of said magnet means and said toroidal core thereby varying the toroidal inductor output amplitude from a second portion of said coil means when said first coil portion is excited together with means for exciting said first coil and means for measuring the voltage induced in said second coil portion and relating said second voltage to the applied pressure, and the allowing monitoring of differential pressures further comprising means defining plural cavities separated by said movable wall.

29. System according to claim 27, wherein said means for excitation comprises a sine wave generator.

30. System according to claim 27 wherein said toroidal inductor is encapsulated in a non-conductive material offering improved electrical isolation.

31. System according to claim 27 wherein said transformer is an auto-transformer.

32. System according to claim 27 wherein said transformer is an isolation transformer.

33. System according to claim 27 wherein said movable wall is a diaphragm.

34. System according to claim 27 wherein said toroidal core is comprised of a high permeability material.

35. System according to claim 27 wherein said magnet means comprises a disk magnet arranged as a monopole facing said toroidal core generally radially thereof.

36. Transducer system for movement or position measuring using coercive forces and a toroidal inductor wound as a transformer that transduces applied, variable force or pressure to be measured to continuously variable output amplitudes, comprising a magnet, means responsive to the applied force or pressure to be measured for moving said magnet adjacent said inductor and means for exciting at least one coil portion of said toroidal inductor sinusoidlly in a non-saturating mode so that the current induced in another portion of said toroidal inductor is generally linearly continuously dependent upon the generally radial distance separating said magnet and said toroidal inductor.

37. Position and motion transducer system comprising a permanent magnet the position of which is to be measured, an appropriately oriented toroidal transformer, the magnet disposed adjacent the transformer, which can be either an isolation transformer or an autotransformer, said permanent magnet comprising a disk magnet with a surface mono-pole facing generally radially the torus, and means providing generally sinusoidal excitation of one winding of the toroidal transformer to enable readout equipment connected with another winding thereof to generally linearly continuously indicate the position and movement of the magnet relative the toroidal transformer.

38. Method of movement, position or pressure transducing comprising providing movable magnet means and a toroidal inductor adjacent thereto, the position of said magnet means being generally radial relative to said toroidal inductor and being directly related radially to the applied force pressure to be measured, said toroidal inductor comprising a toroidal core upon which is wound coil means of suitable inductance, said coil means being configured to allow sinusoidal excitation of a portion thereof from an external source and formed as a transformer, enabling an applied force, movement, position or pressure to cause said magnet to continuously variably coerce the magnetic flux contained within the aforementioned toroidal core, the variation in such coercion being dependent upon the radial separation of said magnet means and said toroidal core and exciting a portion of said toroidal inductor and thereby generally linearly continuously varying the toroidal inductor output amplitude from a second portion of said coil means dependent upon the force or pressure applied.

39. Method defined in claim 38 wherein said step of exciting comprises exciting with an A-C sine wave signal.

40. Method of movement, position or pressure transducing comprising providing movable magnet means and a toroidal inductor adjacent thereto, the position of said magnet means being generally radial relative said toroidal inductor and being directly related radially to the applied force, movement, position or pressure, said toroidal inductor comprising a toroidal core upon which is wound coil means of suitable inductance, said coil means being configured to allow excitation of a portion thereof from an external source and formed as a transformer, enabling an applied force, movement, position or pressure to cause said magnet to variably coerce the magnetic flux contained within the aforementioned toroidal core, the variation in such coercion being dependent upon the radial separation of said magnet means and said toroidal core and exciting a portion of said toroidal inductor and thereby varying the toroidal inductor output amplitude from a second portion of said coil means dependent upon the force, movement, position, or pressure applied, said step of exciting comprises exciting said transformer in a non-resonant, non-saturating mode.

* * * * *